United States Patent
Ingram-Tedd et al.

(10) Patent No.: US 12,071,307 B2
(45) Date of Patent: Aug. 27, 2024

(54) SYSTEM AND METHOD OF ORDER FULFILMENT

(71) Applicant: Ocado Innovation Limited, Hatfield (GB)

(72) Inventors: Andrew John Ingram-Tedd, Hatfield (GB); Lars Sverker Lindbo, Hatfield (GB); Matthew Robert Whelan, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 824 days.

(21) Appl. No.: 17/252,385

(22) PCT Filed: Jun. 20, 2019

(86) PCT No.: PCT/EP2019/066412
§ 371 (c)(1),
(2) Date: Dec. 15, 2020

(87) PCT Pub. No.: WO2019/243549
PCT Pub. Date: Dec. 26, 2019

(65) Prior Publication Data
US 2021/0261336 A1  Aug. 26, 2021

(30) Foreign Application Priority Data
Jun. 20, 2018 (GB) .................... 1810128

(51) Int. Cl.
*B07C 3/08* (2006.01)
*B65G 1/04* (2006.01)
(Continued)

(52) U.S. Cl.
CPC ......... *B65G 1/1378* (2013.01); *B65G 1/0464* (2013.01); *B65G 1/0485* (2013.01);
(Continued)

(58) Field of Classification Search
CPC .. B65G 1/1378; B65G 1/0464; B65G 1/0485; B65G 1/0492; B65G 1/065; B65G 1/1373; B66F 9/063; B07C 3/08
See application file for complete search history.

(56) References Cited

U.S. PATENT DOCUMENTS 9,111,251 B1  8/2015  Brazeau
9,248,973 B1  2/2016  Brazeau
(Continued)

FOREIGN PATENT DOCUMENTS

AU    2016315404 B2   11/2018
CN    103264863 A     8/2013
(Continued)

OTHER PUBLICATIONS

International Search Report (PCT/ISA/210) issued on Oct. 8, 2019, by the European Patent Office as the International Searching Authority for International Application No. PCT/EP2019/066412.
(Continued)

*Primary Examiner* — Patrick H Mackey
(74) *Attorney, Agent, or Firm* — Buchanan Ingersoll & Rooney PC

(57) ABSTRACT

A system and method of order fulfilment is described. The system includes a storage and retrieval system, a transfer system and at least one pick station. The transfer system includes conveyance means disposed between the storage and retrieval system and the pick station such that items delivered to the transfer system from the storage and retrieval system may be conveyed to the pick stations independently of the normal operation of the pick station.

16 Claims, 7 Drawing Sheets

Figure 1A:
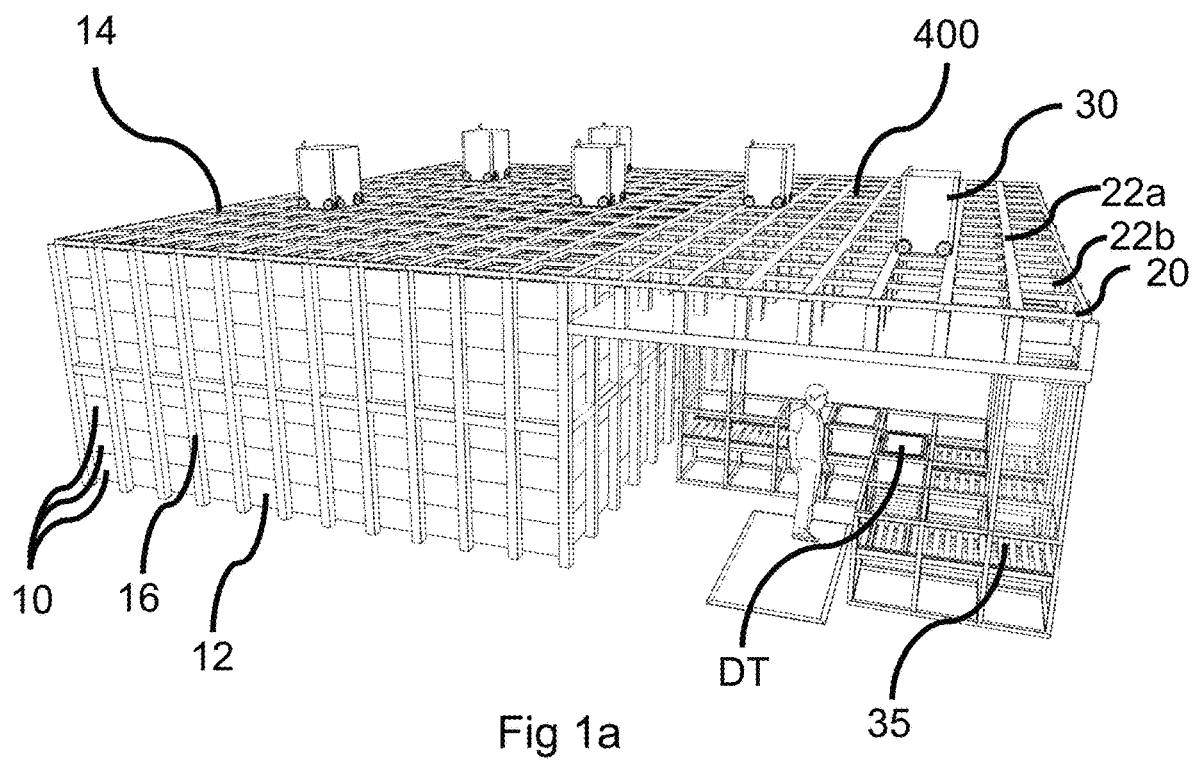

(51) Int. Cl.
B65G 1/06 (2006.01)
B65G 1/137 (2006.01)
B66F 9/06 (2006.01)

(52) U.S. Cl.
CPC .......... B65G 1/0492 (2013.01); B65G 1/065 (2013.01); B66F 9/063 (2013.01); *B07C 3/08* (2013.01)

(56) References Cited

U.S. PATENT DOCUMENTS

| | | | |
|---|---|---|---|
| 9,796,080 | B2 | 10/2017 | Ingram-Tedd et al. |
| 9,908,696 | B1 | 3/2018 | Zevenbergen |
| 10,207,871 | B2 | 2/2019 | Issing |
| 10,556,742 | B2 | 2/2020 | Lindbo et al. |
| 10,822,166 | B2 | 11/2020 | Ingram-Tedd et al. |
| 11,453,552 | B2 | 9/2022 | Lindbo et al. |
| 11,851,276 | B2 | 12/2023 | Lindbo et al. |
| 2016/0129587 | A1 | 5/2016 | Lindbo et al. |
| 2016/0145058 | A1* | 5/2016 | Lindbo ................ B65G 1/0457 700/218 |
| 2016/0347545 | A1 | 12/2016 | Lindbo et al. |
| 2017/0152106 | A1* | 6/2017 | Hofmann ............. B65G 1/1378 |
| 2018/0043528 | A1 | 2/2018 | Lindbo et al. |
| 2018/0044110 | A1 | 2/2018 | Clarke et al. |
| 2018/0065805 | A1* | 3/2018 | Zevenbergen ....... B65G 1/0492 |
| 2018/0118462 | A1 | 5/2018 | Zevenbergen |
| 2018/0162639 | A1 | 6/2018 | Ingram-tedd et al. |
| 2018/0186572 | A1 | 7/2018 | Issing |
| 2018/0319590 | A1 | 11/2018 | Lindbo et al. |
| 2018/0346243 | A1* | 12/2018 | Lindbo ............... G07F 11/1657 |
| 2018/0354717 | A1 | 12/2018 | Lindbo et al. |
| 2020/0223629 | A1 | 7/2020 | Lindbo et al. |
| 2020/0407160 | A1 | 12/2020 | Ingram-Tedd et al. |
| 2023/0271778 | A1 | 8/2023 | Lindbo et al. |

FOREIGN PATENT DOCUMENTS

| | | |
|---|---|---|
| CN | 105488653 A | 4/2016 |
| CN | 105931448 A | 9/2016 |
| CN | 106897852 A | 6/2017 |
| CN | 106956883 A | 7/2017 |
| CN | 107922115 A | 4/2018 |
| DE | 102014111396 A1 | 2/2016 |
| EP | 2530035 B1 | 11/2013 |
| EP | 3030504 B1 | 2/2018 |
| GB | 2524383 A | 9/2015 |
| GB | 2574702 A | 12/2019 |
| JP | H08217209 A | 8/1996 |
| JP | 2005015102 A | 1/2005 |
| JP | 2014141313 A | 8/2014 |
| JP | 2016525490 A | 8/2016 |
| JP | 2017506612 A | 3/2017 |
| KR | 20180016422 A | 2/2018 |
| NO | 317366 B1 | 10/2004 |
| WO | 2016172253 A1 | 10/2016 |
| WO | 2016198467 A1 | 12/2016 |
| WO | WO-2016198467 A1 * | 12/2016 ............... B65G 1/04 |
| WO | 2017036780 A1 | 3/2017 |
| WO | 2017081275 A1 | 5/2017 |
| WO | 2019197497 A1 | 10/2019 |

OTHER PUBLICATIONS

Written Opinion (PCT/ISA/237) issued on Oct. 8, 2019, by the European Patent Office as the International Searching Authority for International Application No. PCT/EP2019/066412.

Office Action (Notice of Allowance) issued on Feb. 24, 2023, by the Korean Patent Office in corresponding Korean Patent Application No. 10-2020-7034749, and a partial English Translation of the Office Action. (3 pages).

Final Office Action issued on Jul. 19, 2022, by the Japanese Patent Office in corresponding Japanese Patent Application No. 2020-570970, and an English Translation of the Office Action. (7 pages).

Office Action (Request for the Submission of an Opinion) issued on Aug. 24, 2022, by the Korean Patent Office in corresponding Korean Patent Application No. 10-2020-7034749, and an English Translation of the Office Action. (17 pages).

Office Action issued on Sep. 20, 2022, by the Canadian Patent Office in corresponding Canadian Patent Application No. 3,104,014. (3 pages).

Office Action issued on May 16, 2022, by the Chinese Patent Office in corresponding Chinese Patent Application No. 201980041227.1. (10 pages).

First Office Action issued on Feb. 8, 2022, by the Japanese Patent Office in corresponding Japanese Patent Application No. 2020-570970, and an English Translation of the Office Action. (12 pages).

Office Action issued on Feb. 11, 2022, by the Canadian Patent Office in corresponding Canadian Patent Application No. 3,104,014. (4 pages).

Office Action (Examination Report No. 1) issued on Aug. 18, 2021, by the Australian Patent Office in corresponding Australian Patent Application No. 2019291110. (4 pages).

Office Action (Decision of Rejection) issued on Nov. 15, 2022, by the Japanese Patent Office in corresponding Japanese Patent Application No. 2020-570970, and an English Translation of the Office Action. (4 pages).

Office Action (The Third Office Action) issued on Nov. 2, 2022, by the Chinese Patent Office in corresponding Chinese Patent Application No. 201980041227.1, and an English Translation of the Office Action. (8 pages).

Office Action issued on Oct. 19, 2021, by the Chinese Patent Office in corresponding Chinese Patent Application No. 201980041227.1. (10 pages).

Office Action (Communication) issued on Jan. 25, 2024, by the European Patent Office in corresponding European Patent Application No. 19 732 632.5. (6 pages).

First Office Action issued on Mar. 19, 2024, by the Japanese Patent Office in corresponding Japanese Patent Application No. 2023-025213, and an English Translation of the Office Action. (6 pages).

* cited by examiner

SYSTEM AND METHOD OF ORDER FULFILMENT

The present invention relates to system and method for order fulfilment. More specifically but not exclusively, it relates to a system and method of order fulfilment of items to fulfil customer orders in an online retail environment.

Some commercial and industrial activities require systems that enable the storage of a large number of different stock items and for such items to be retrieved and picked to form customer orders.

In one known type of system for the storage and retrieval of items of multiple product lines, items are located in storage bins or containers. The bins or containers are arranged in stacks on top of one another, the stacks being arranged in rows. The storage bins or containers are accessed from above and removed from the stacks by load handling devices. EP 3,030,504 B1 (Ocado Innovation Limited) describes such a robotic picking system in which stacks of containers are arranged within a frame structure. A system of this type is illustrated schematically in FIGS. 1 and 2 of the accompanying drawings. The robotic load handling devices are controllably moved around on a system of tracks, the tracks forming a grid located above the stacks of containers.

In the robotic storage and retrieval system described in EP 3,030,504 B1, the grid comprises a series of grid spaces defined by the tracks, each stack of containers being located within the footprint of a single grid space. In use, the robotic load handlers run on the tracks above the stacks and are controllably positioned above a predetermined stack of containers. Once in position, a lifting mechanism is lowered from the robotic load handling device, a part of which, a gripper device, engages with a container and lifts said bin or container from the stack in to a cavity within the load handling device. In this particular system the cross-section of the robotic load handling device substantially conforms to the area of a single grid space. Furthermore, the tracks and robotic load handling devices are configured such that two load handling devices may occupy adjacent grid spaces and pass each other in either direction when in operation.

Another form of robotic load handling device is described in, for example, Norwegian patent number NO 317366 B1 (Autostore AS), in which cantilever-type load handling devices disclosed occupy two grid spaces when in operation. The present invention may be applied to storage and retrieval systems using such cantilever-type load handling devices. Additionally, it will be appreciated that in the context of the invention described in more detail below, with reference to the specific embodiments, any form or configuration of load handling device may be used in place of the two examples described above.

In known grid-based storage and retrieval systems described such as that described above with reference to EP 3,030,504 B1, the storage bin or container is lifted from a stack, the storage bin or container containing inventory items needed to fulfil a customer order. Once lifted by the load handling device, the storage bin or container is delivered, by the load handling device, to an output port above or adjacent a pick station or to the pick station per se. In this way, the storage bin or container is moved from the storage and retrieval area of the system to a point where the items can be removed from the storage containers or bins and transferred in to delivery containers comprising the customer order.

In a further form of known storage and retrieval system as described in detail in EP 2,530,035 B1 (Dematic GmbH), the items or objects are stored in storage bins or containers on shelves or racks, the storage bins or containers being retrieved by shuttles. The shuttles move the storage containers or bins to a system of lifts that move the storage containers or bins to a series of conveyors that transport the storage bins or containers to pick stations, where the items or objects to be removed from the storage bins or containers or bins in to delivery containers comprising the customer order. Whilst the rack and shuttle system of such a storage and retrieval portion differs structurally from the grid-based storage and retrieval system described in EP 3,030,504 B1, both result in bins or containers comprising items to be picked being transported to pick stations.

The storage and retrieval systems described above are commonly referred to as "goods to man" picking systems. A storage container or bin is brought to a location, the pick station, where it is temporarily located in close proximity to a delivery container comprising a customer order for the required item to be moved from the storage container or bin to the customer container or bin. The structural arrangements of such "goods to man" pick stations are amongst the most efficient and productive ways to move a required item from a storage container or bin, to a customer order container or bin—as the structural arrangements of the pick station are such that an operative located at the pick station does not have to walk during the picking process—the items are simply moved from one container to another. In this way, all available operative time can be devoted to picking items.

It will be appreciated that the structural arrangements of such pick stations also lend themselves more easily to robotic picking of items from storage bins or containers in to customer orders. At the pick stations in the above described systems, the required inventory item or items may be manually or robotically removed from the storage bin or container and placed in a delivery container, the delivery container forming the customer order or part thereof, and being filled for dispatch at the appropriate time.

It will further be appreciated that such an order may comprise a plurality of delivery containers, the number of delivery containers required being defined by the number of items or products ordered. Accordingly, a large number of storage containers or bins may need to be moved from storage positions within storage and retrieval locations to the pick stations.

The number of pick stations in any order picking system is limited by the space available for the footprint of the pick stations and the storage and retrieval system as a whole in a chosen building. As a result of this, frequently required items and products may need to be transported many times by the robotic load handlers or shuttles and conveyors, as appropriate, to and from the pick stations, thereby increasing the number of movements required by handlers or shuttles.

However, "goods to man" systems, such as those described above, tend to be expensive. In many cases, and particularly in grocery order picking, a relatively small number of item types, (stock keeping units or SKUs) account for a large proportion of the total items picked. Therefore, the same storage containers or bins are required to be brought to the pick stations many times.

Methods and systems of reducing the number of storage container or bin movements to a given pick station have been proposed and one such method and system is described in GB 2,524,383 B1 (Ocado Innovation Ltd). In the system and method described, a holding facility is provided at each pick station such that operatives can pick a plurality of commonly required items in to a temporary storage location at the pick station. While this system and method produces significant benefits, these are limited by the size of the pick station, the size of the temporary holding facility and the number of orders which can be processed at one pick station during the planning horizon.

The present invention aims to overcome the problem of requiring the same container or bin or SKU to be presented at a given pick station repeatedly thereby reducing load handling device movements above the pick stations or at the output ports of the grid-based or other storage and retrieval system, or congestion of storage bins or containers at pick stations. Advantageously, this can both lower the cost per transaction, where a transaction is defined as the movement of an item from a storage bin to a delivery container, for example and increase the throughput of a given storage and retrieval system.

It will be appreciated that known storage and picking systems described above, are operated under the control of computer utilities acting so as to control the movement and location of storage bins or containers and delivery containers, the movement and location of stock, and the location and number of operatives required at any given point in the system. Additionally, in a grid-based system the computer utilities control the movement and location of the load handling devices and may control the communication between the load handling devices and the order picking system.

According to the invention there is provided a fulfilment system comprising a storage and retrieval system and a pick station, the pick station comprising a storage item side and a picked item side, the fulfilment system further comprising a transfer system positioned between the storage and retrieval system and the pick station, the transfer system comprising a transfer station and conveyance means linking the transfer station to the storage side of the pick station such that a portion of items to be picked in to delivery containers at the pick station are supplied to the pick station by the conveyance means.

According to the invention there is further provided a method of handling items in a fulfilment system comprising a storage and retrieval system, a transfer system and a pick station, the method comprising retrieving a container 10 comprising the required items from the storage and retrieval system, transferring the items from the retrieved container to a transfer station in the transfer system, transferring at least one item from the transfer station to conveyance means conveying the transferred item or items to the pick station and picking the item from the conveyance means at the pick station.

In this way, the present invention overcomes the problems of the prior art and provides a system and method of temporarily increasing the possible throughput of a given system without requiring the number of output ports and pick stations to be increased or the number of robotic load handlers on the system to be increased. Indeed, the present invention may enable a reduction of robotic load handlers on the system hence reducing the capital cost of the system.

Figure 1B:
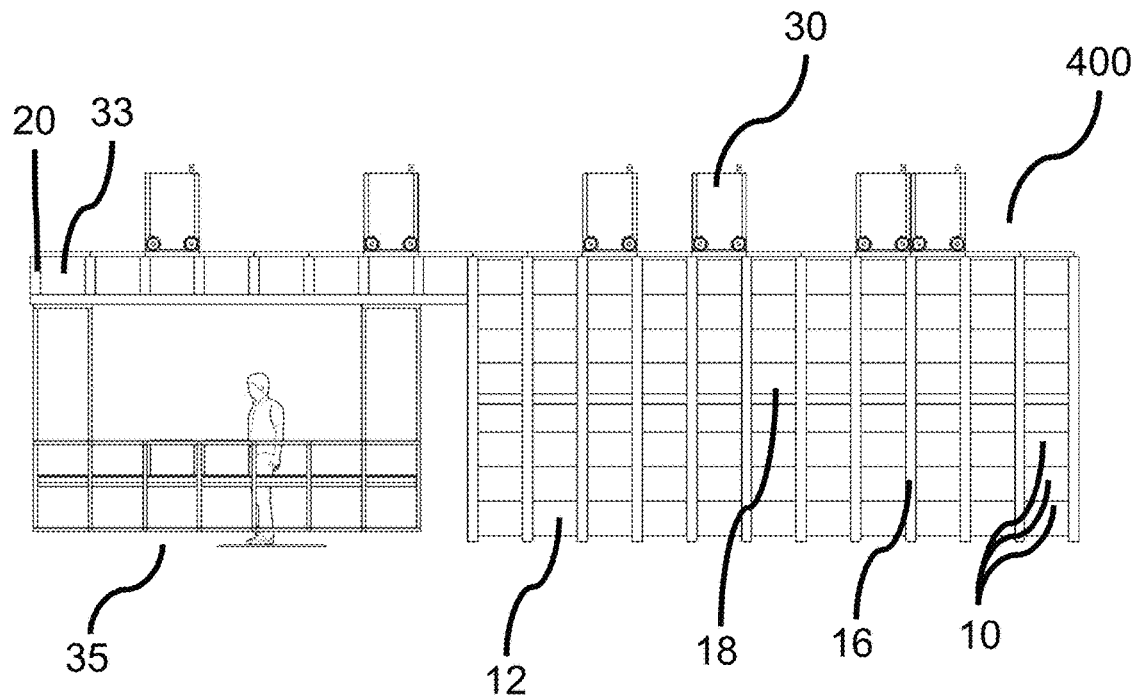
Figure 1C:
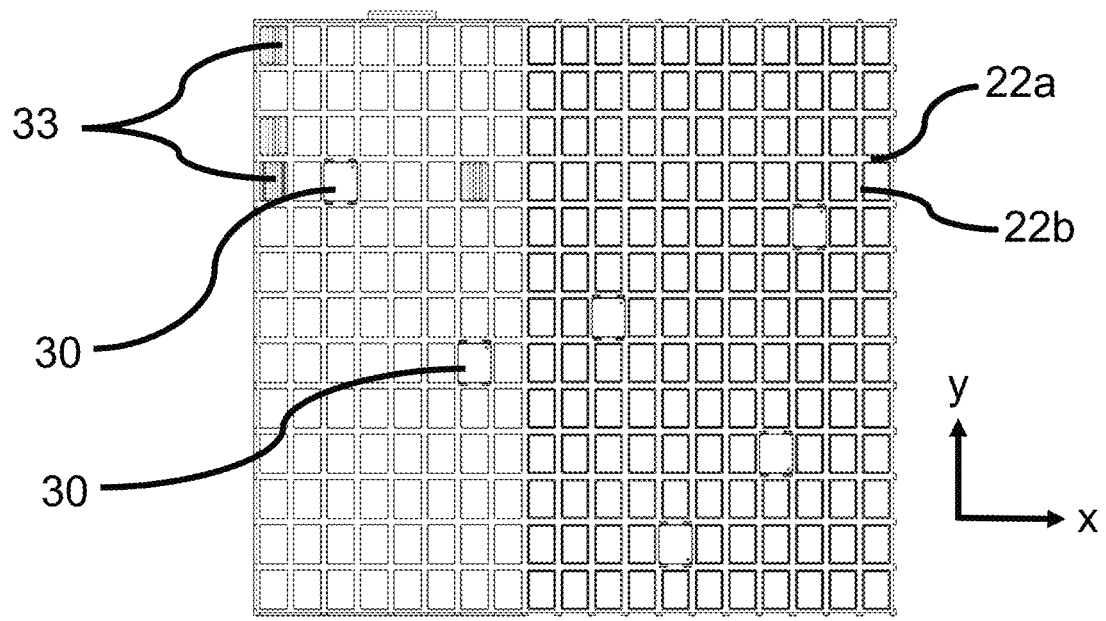
Figure 2:
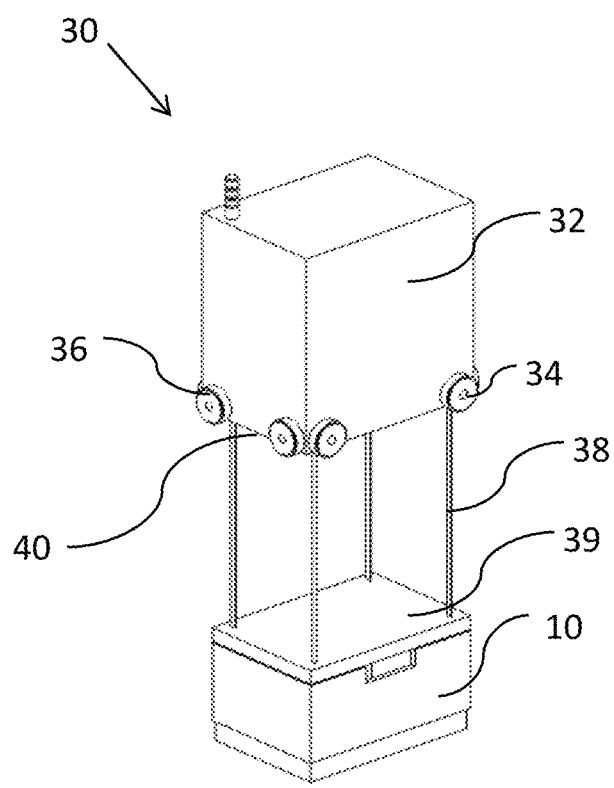
Figure 3A:
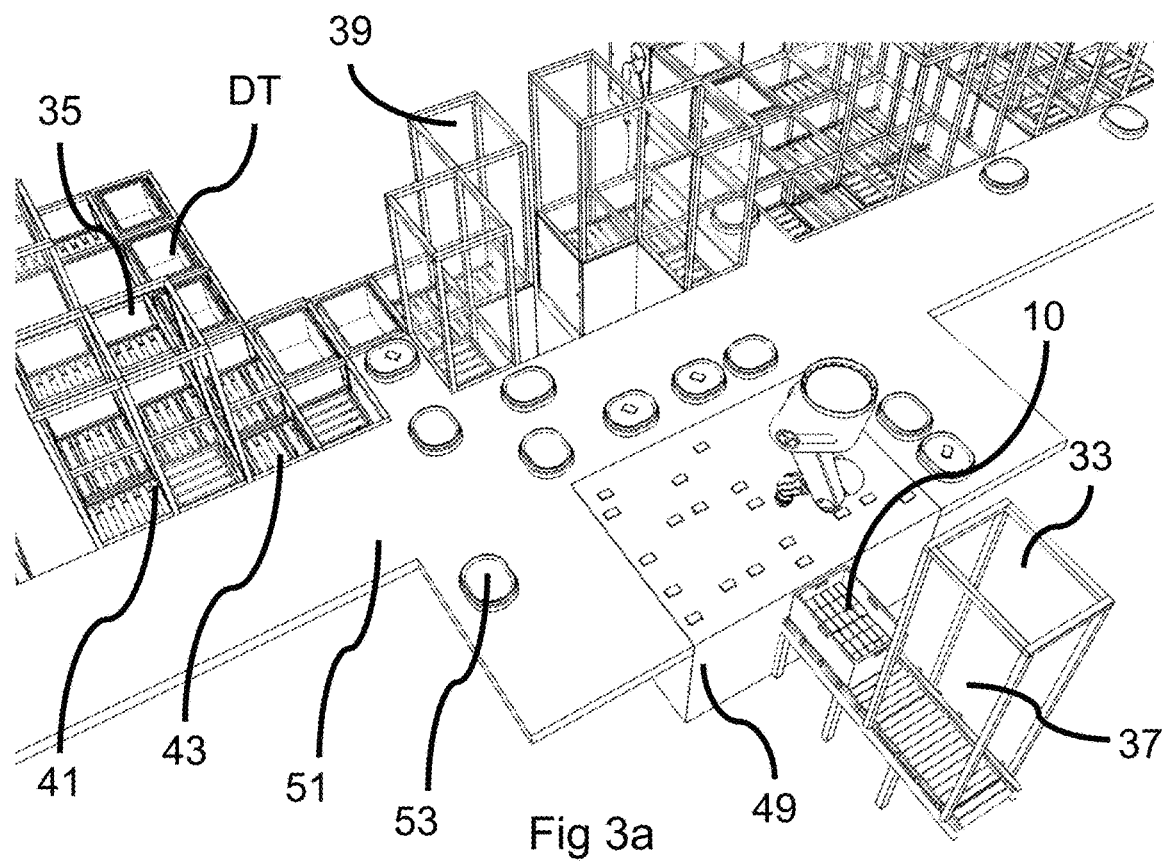
Figure 3B:
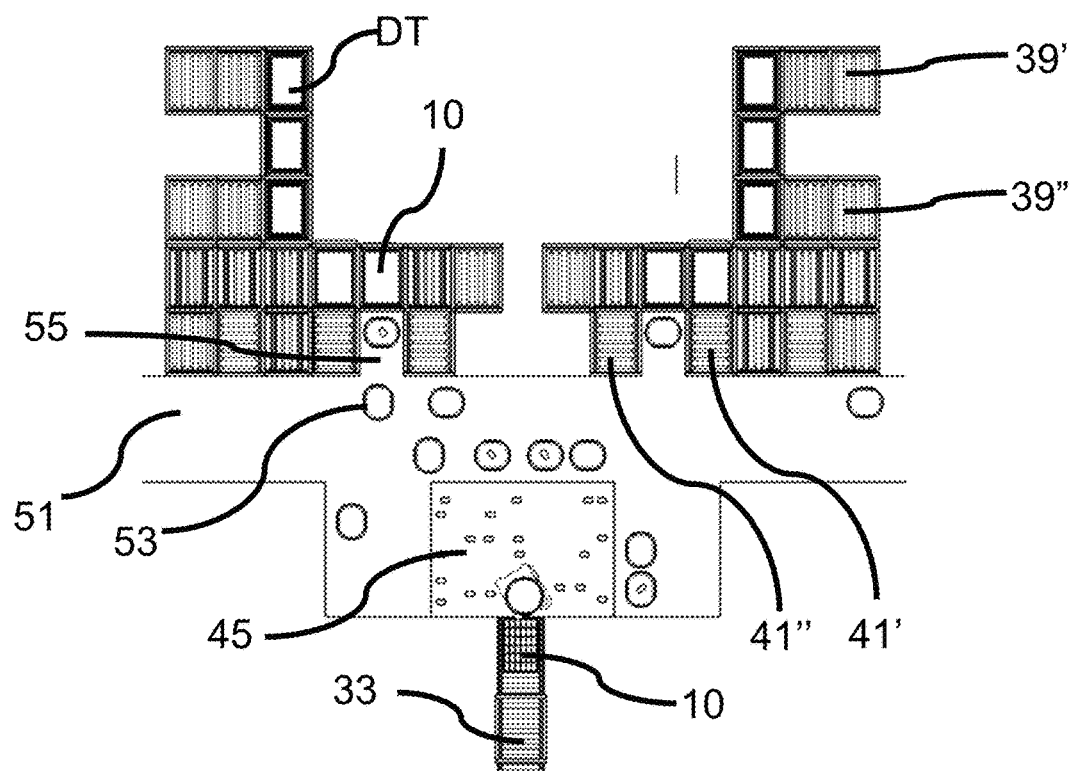
Figure 3C:
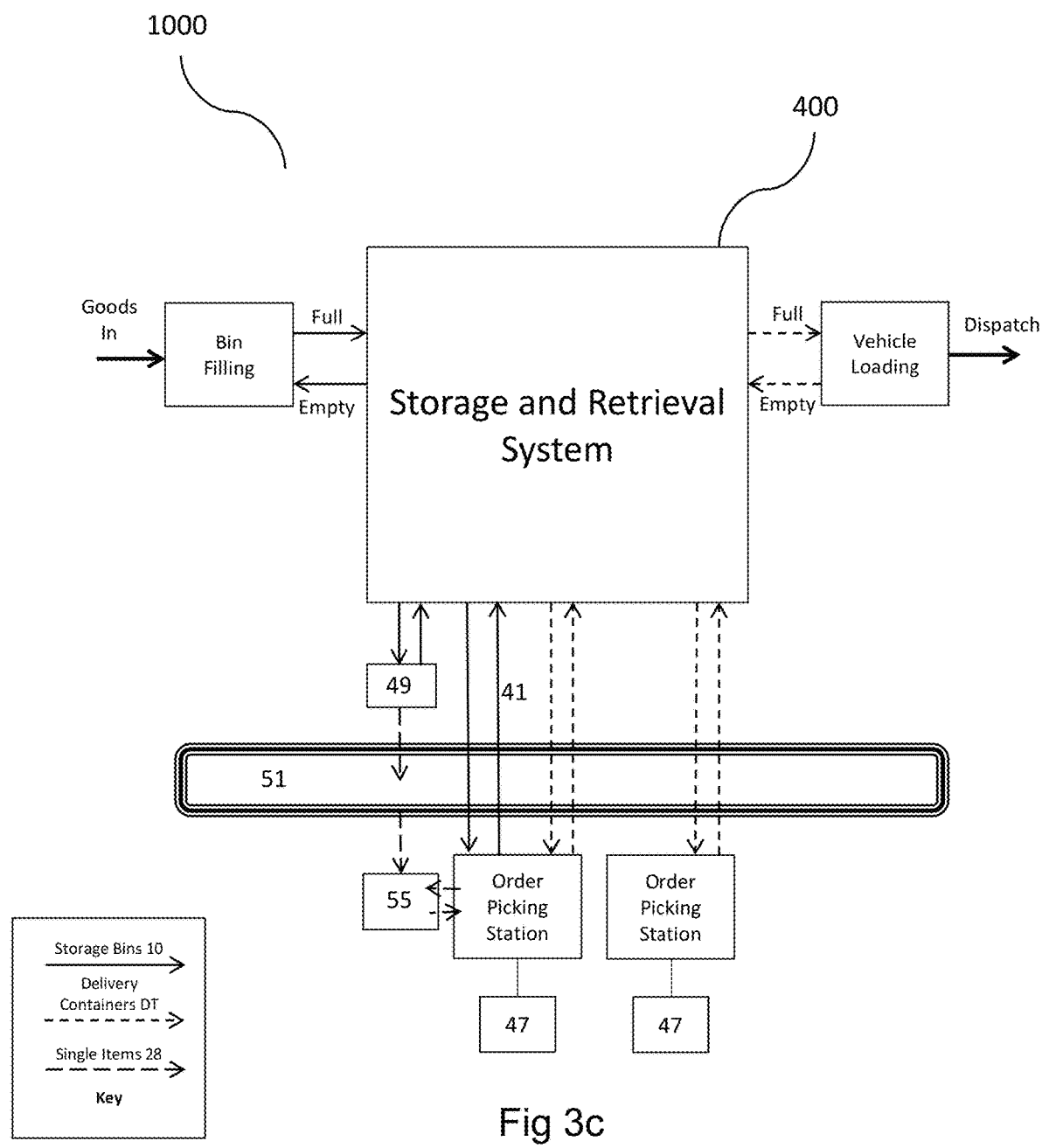

The invention will now be described with reference to the accompanying diagrammatic drawings in which:

FIG. 1*a* is a schematic perspective view of one form of grid-based storage and retrieval system, showing containers in stacks within a framework, where load handling devices are operative on tracks above the framework to retrieve containers and deliver said containers to an output port above a pick station;

FIG. 1*b* is a schematic side view of the storage and retrieval system of FIG. 1*a* showing an operative in situ in the pick station of the storage and retrieval system of FIG. 1*a*;

FIG. 1*c* is a schematic plan view of the storage and retrieval system of FIGS. 1*b* and 1*c*, showing the output ports in the storage and retrieval system;

FIG. 2 is a schematic perspective view of one form of load handling device operable on the storage and retrieval system of FIGS. 1*a*, 1*b* and 1*c*;

FIG. 3*a* is a schematic perspective view of a series of pick stations forming part of a storage, retrieval and picking system according to one aspect of the present invention, the pick stations comprising an intermediate holding facility, the pick station intermediate holding facility being supplied with items for picking by a plurality of item transport devices, the item transport devices being supplied with items from the storage and retrieval system via a robotic picking system at a transfer station;

FIG. 3*b* is a schematic plan view of a pick station and pick station intermediate holding facility of FIG. 3*a*;

FIG. 3*c* is a schematic block diagram showing the features of the system shown in FIGS. 3*a* and 3*b*

Figure 4A:
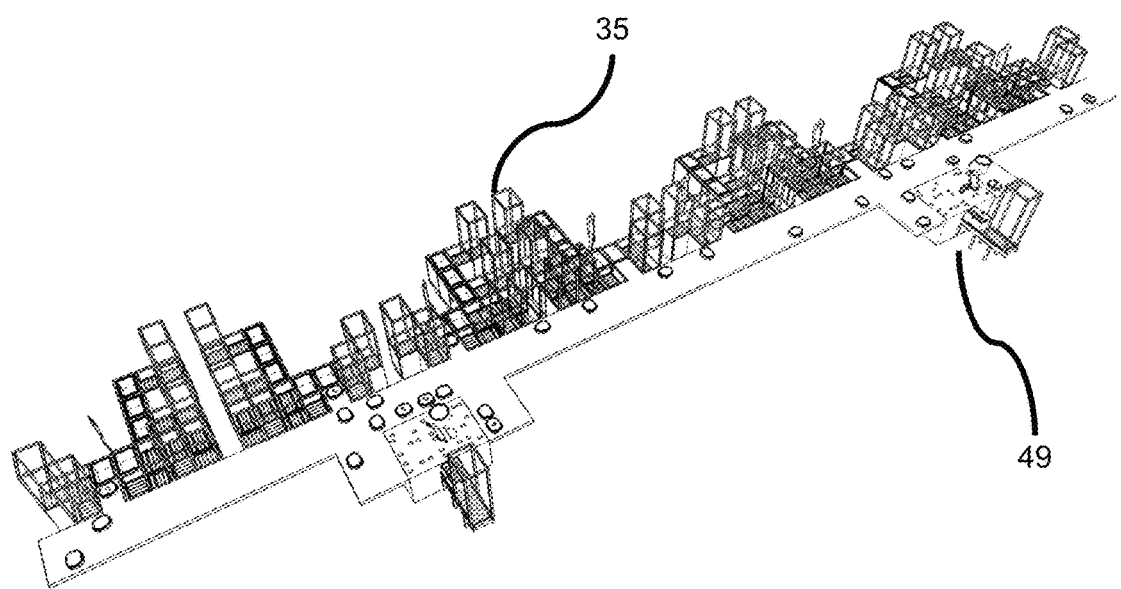
Figure 4B:
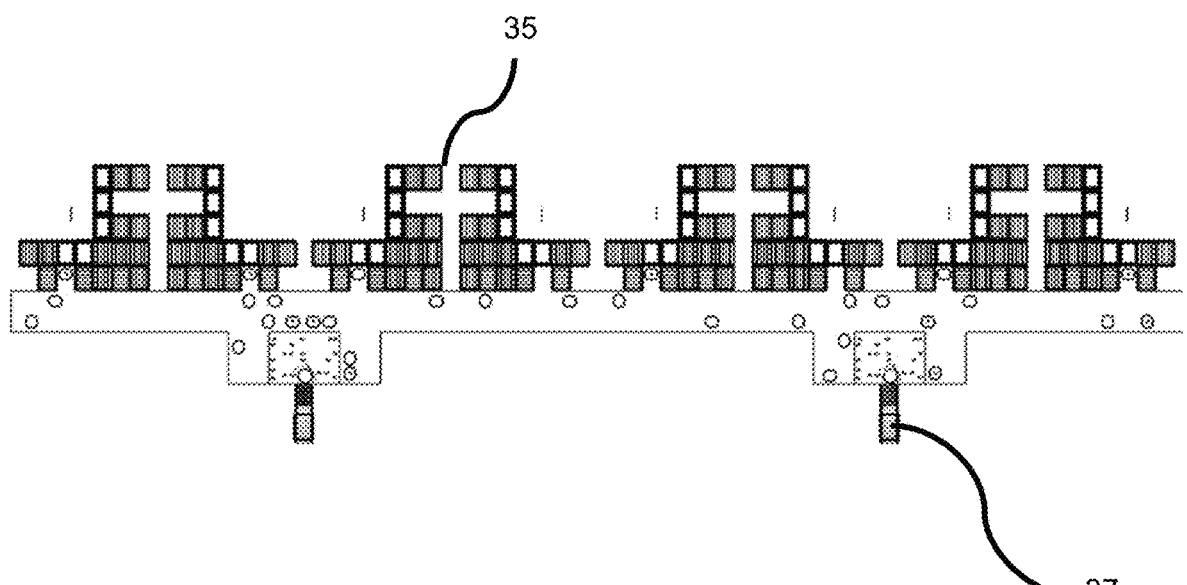
Figure 4C:
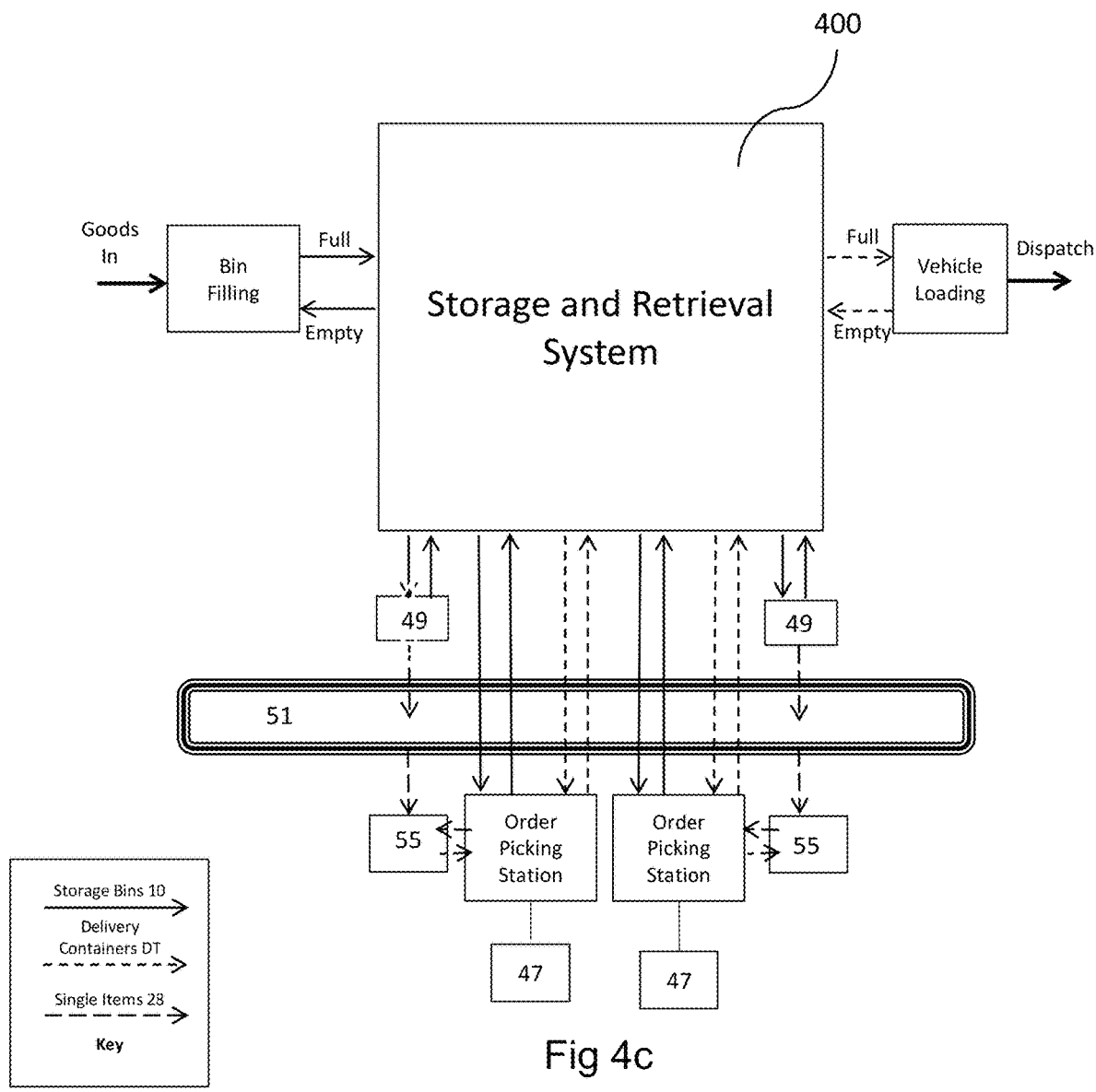
Figure 5A:
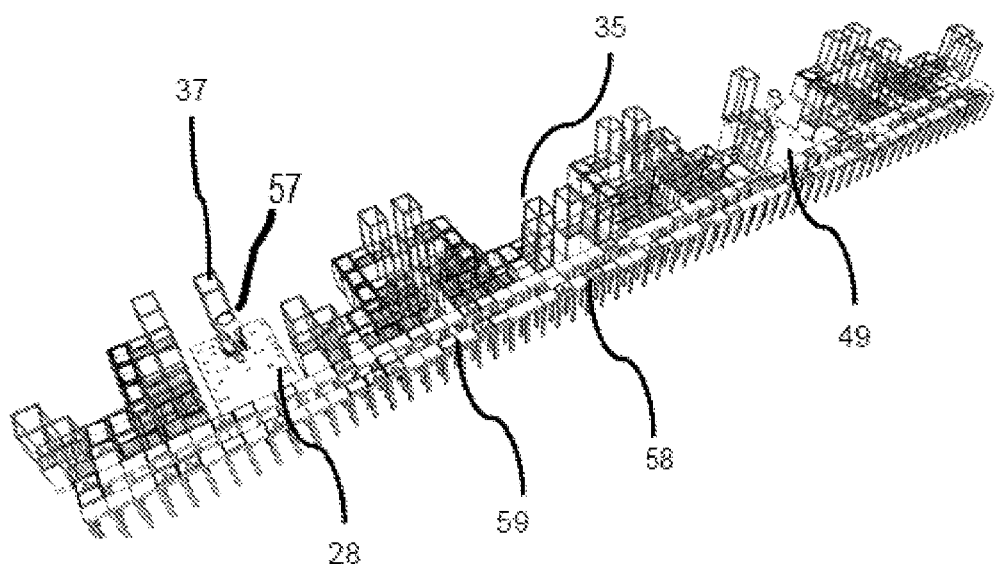
Figure 5B:
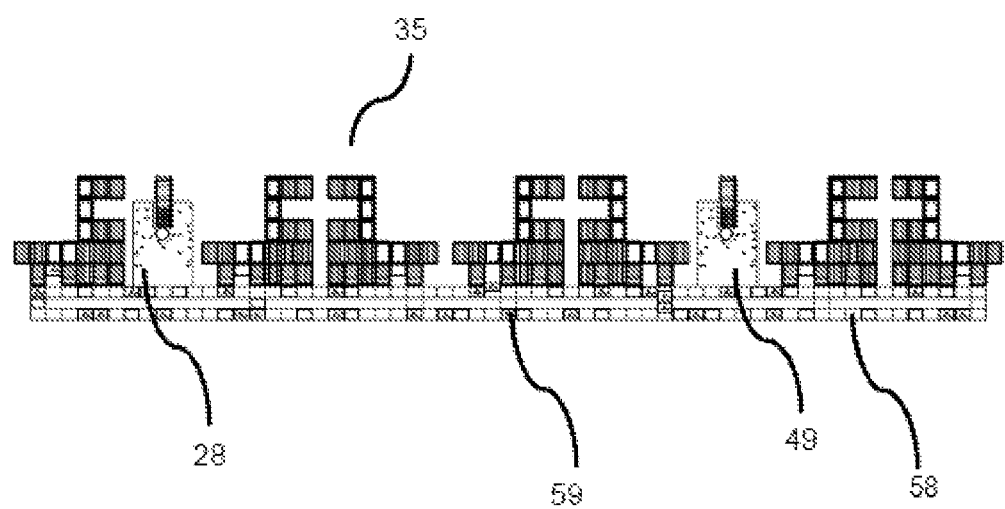

FIG. 4*a* is a schematic plan view of a further form of the invention of FIGS. 3*a*, 3*b* and 3*c* in which the item transport devices may be supplied from a plurality of transfer stations before onward transportation to any intermediate holding facility of any pick station;

FIG. 4*b* is a schematic plan view of the system of FIG. 4*a*;

FIG. 4*c* is a schematic block diagram showing the features of the system of FIGS. 4*a* and 4*b*;

FIG. 5*a* is a schematic perspective view of a further form of the invention in which the item transport devices comprise a series of trays moved between intermediate holding facilities of various pick stations on conveyance means; and FIG. 5*b* is a schematic plan view of the pick station and conveyance arrangement of FIG. 5*a*.

In the description below, 'storage bins 10' will be used to denote containers, bins or totes intended for the storage of inventory items, whilst 'delivery containers DT' will be used to denote containers, bins or totes intended to be filled to fulfil orders placed by customers, and 'trays' will be used to denote containers, bins or totes for transporting items or SKUs in an online retail environment or otherwise. It will be appreciated that this terminology is used for ease of reference and explanation within this document. However, it should be noted that the storage bins 10, trays and the delivery containers DT may be of the same shape and configuration. Furthermore, delivery containers DT may be stored in storage bins 10 (known as nested containers) within the storage system or any part thereof. It is the function of the bin, container, tray or tote that defines the category of 'container' rather than any change in the actual size, shape, or configuration.

Moreover, the invention will be described in the first instance as applied to a grid-based storage and retrieval system as shown schematically in FIGS. 1 and 2 and more completely described in EP 3,030,504 B1 and incorporated herein by reference and described in detail therein. For the purposes of the present description, the detailed operation of a grid-based storage and retrieval system will not be repeated here, only basic operational requirements with respect to the interface with the present invention will be described. Furthermore, it will be appreciated that the invention may be applied and interfaced to other forms of storage and retrieval systems both of the grid-based variety and having other arrangements and configurations.

One form of the invention will now be described with reference to the storage system of FIGS. 1 and 2.

In the system as shown in FIG. 1, stackable storage bins 10, are stacked on top of one another to form stacks 12. The stacks 12, which may be of variable height and may comprise a variable number of storage bins 10, are arranged within a frame structure 14 in a warehousing or manufacturing environment. FIG. 1 is a schematic perspective view of the frame structure 14 including the stacks 12 of bins 10. Each storage bin 10 typically holds a plurality of products or inventory items 28, and the products or inventory items 28 within a bin 10 may be identical, or may be of different product types depending on the use to which the storage, retrieval and picking system is put. For example, the items may be parcels or letters or other items requiring storage, retrieval or picking. Furthermore, the storage bins 10 may be physically subdivided to accommodate a plurality of different inventory items 28.

The frame structure 14 of the storage system comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal but any suitable material having the required structural characteristics may be used. The storage bins 10 are stacked between the members 16, 18, 20 of the frame structure 14, so that the frame structure 14 guards against horizontal movement of the stacks 12 of storage bins 10, and guides vertical movement of the storage bins 10.

The top level of the frame structure 14 includes rails 22 arranged in a grid pattern across the top of the stacks 12. As can be seen in FIG. 1, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

One form of load handling device is shown in more detail in FIG. 2. Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

In this way, one or more robotic load handling devices 30 can move around above the top layer of the stacks 12 on the frame structure 14, as shown in FIG. 1 under the control of a centralised control utility (not shown). Each robotic load handling device 30 is provided with lifting means 38 for lifting one or more storage bins 10 from the stack 12 to access the bin 10 comprising the required items or products 28.

The body of the vehicle 32 comprises a cavity 40, the cavity 40 being sized so as to hold a storage bin 10. The lifting means 38 preferably comprises winch means and a storage bin 10 gripper assembly 39. The lifting means 38 in use is lowered and engages a storage bin 10 in a stack 12 and is winched upwardly, once engaged with the storage bin 10, and as such lifts a storage bin 10 from the stack 12 to within the cavity 40 in the body of the vehicle 32.

In this way, using a plurality of robotic load handling devices 30 on a grid-based storage system allows multiple bins 10 of products, items or goods to be retrieved from multiple locations in stacks 12 at any one time.

Once retrieved, the bin 10 located within the cavity 40 in the body 32 of the load handling device 30 can be transported to any point on the grid by the load handling device 30. As described above, and with reference to EP 3,030,504 B1, the retrieved bin 30 is transported to an output port 33 of the storage and retrieval system from where it is transferred to a pick station 35.

At the pick station 35, the storage bin 10 is automatically positioned before an operative and adjacent or in the vicinity of a delivery container DT. The operative may then pick the required number of items from the storage bin 10 and transfer the picked item or items to the delivery container DT. The delivery container DT is then routed to a dispatch area from where it is loaded on to appropriate transport to be delivered to a customer. In the specific embodiment described with reference to FIGS. 1 and 2, the delivery containers DT are routed to the dispatch area via the storage and retrieval system. This is advantageous in the case of orders that are being picked some time prior to the desired time for dispatch. However, it will be appreciated that should a different design or implementation of storage and retrieval system be used this need not be the case, the delivery container may be routed for dispatch directly from the pick station 35. The storage bin 10 is returned to the storage and retrieval system 400.

It will be appreciated from the above description that the storage bins 10 containing products or items 28 and storage containers 10 comprising delivery containers DT are all routed via a pick station 35.

FIGS. 3a, 3b and 3c show a first embodiment of the invention. In FIGS. 3a and 3b for ease of reference, the storage and retrieval system 400 is not shown. In this embodiment of the invention, the output port 33 of the storage and retrieval system 400 comprises an empty column of the framework 14 of the storage and retrieval system 400 forming an output chute 37. The output chute 37 of the storage and retrieval system is positioned adjacent but remote from a pick station 35.

The pick station 35 comprises two sections, a delivery container DT side 39 and a storage container 10 side 41. The two sides 39, 41 of the pick station 35 are arranged such that the two sides 39, 41 meet such that an item 28 in a storage container 10 may be moved by the operative located at the pick station 35 in to the delivery container DT.

The delivery container DT side 39 of the pick station 35 comprises a delivery container DT input 39' and a delivery container DT output 39". The delivery container DT input 39' of the pick station 35 comprises an output chute 37 of the storage and retrieval system 400 down which a delivery container DT is lowered by the lifting means 38 of a robotic load handling device 30 when positioned at a port 33 above the output chute 37 of the storage and retrieval system 400.

The delivery container DT output 39" of the pick station 35 comprises an input chute 37 of the storage and retrieval system 400 up which a delivery container DT is lifted by the lifting means 38 of a robotic load handling device 30 when positioned at a port 33 above the input chute 37 of the storage and retrieval system 400.

The delivery container DT input 39' and output 39" are linked by a suitable form of conveyance means 43 adapted to move delivery containers DT from the input 39' to the output 39" of the delivery container DT side 39 of the pick station 35.

The conveyance means 43 on the delivery container DT side of the pick station 35 may be adapted so as to provide a number of presentation positions where delivery containers DT are exposed to the operative in the pick station 35.

The storage container 10 side 41 of the pick station 35 comprises a storage container 10 input 41' and a storage container 10 output 41". The storage container 10 input 41' of the pick station 35 comprises an output chute 37 of the storage and retrieval system 400 down which a storage container 10 is lowered by the lifting means 38 of a robotic load handling device 30 when positioned at an output port 33 above the output chute 37 of the storage and retrieval system 400.

The storage container 10 output 41" of the pick station 35 comprises an input chute 37 of the storage and retrieval system 400 up which a storage container 10 is lifted by the lifting means 38 of a robotic load handling device 30 when positioned at a port 33 above the input chute 37 of the storage and retrieval system 400.

The storage container 10 input 41' and output 41" are linked by a suitable form of conveyance means 43 adapted to move storage containers 10 from the input 41' to the output 41" of the storage container 10 side 41 of the pick station 35.

The conveyance means 43 on the storage container 10 side of the pick station 35 may be adapted so as to provide a number of presentation positions where storage containers 10 are exposed to the operative in the pick station 35.

It will be appreciated that there need not be an input chute 37 and an output chute 37 of each side 39, 41 of the pick station 35, a single chute 37 may service each side of the pick station 35. In this case the lowering and lifting of the storage and delivery containers 10, DT will need synchronisation undertaken by control means (not shown)

It will further be appreciated that the format and structure of the pick station 35 is shown as an example only and many other forms and arrangements of pick stations 35 may be envisioned by a person skilled in the art. For example, delivery containers DT may be presented above storage containers 10 or delivery containers DT may be presented below storage containers 10 at the location of the operative in the pick station 35.

In use, delivery containers DT are lowered down the output chute 37 of the storage and retrieval system 400 on the lifting means 38 of the load handling device 30, the load handling device 30 being positioned over an output port 33 of the storage and retrieval system 400.

The delivery containers DT enter the delivery container DT side 39 of the pick station 35 and move via the conveyance means 43 toward the output of the delivery container DT side 39 of the pick station.

At the same time, storage containers 10 comprising items 28 required to be picked in to delivery containers DT comprising customer orders, enter the storage container 10 side 41 of the pick station 35 and move via the conveyance means 43 toward the output of the storage container 10 side 41 of the pick station.

As the delivery containers DT and storage containers 10 move in their respective directions, the operative located at the pick station 35 moves items from the storage containers 10 to the delivery containers DT as directed by instructions on a suitable graphical user interface (not shown).

It will be appreciated that such co-ordination of delivery containers DT and storage containers 10 is conducted under the control of a suitable computer control utility (not shown).

Whilst the co-ordination of delivery containers DT and storage containers 10 at appropriate presentation positions before the operative is desirable, there are circumstances when it is not possible to exactly match the appropriate delivery container DT with the relevant storage container 10 before the operative. For example, if there is a delay in the load handling device 30 carrying either of the required containers DT, 10 to the output ports 33 of the storage and retrieval system 400 the delivery container DT may arrive at the operative out of sync with the required storage container 10.

Additionally, multiple items 28 may be required from a single storage container 10 but for picking in to multiple delivery containers DT including delivery containers 10 not yet arrived at the pick station 35.

In the instances where this occurs, the pick station 35 is additionally provided with temporary holding locations 47 in which the operative can place items 28 from the presented storage containers 10 in advance of the relevant delivery container DT being presented. Such temporary holding locations 47 are often small and capable of only accommodating one or two items 28.

As will be appreciated from the description above, storage containers 10 are continually brought to the pick stations 35 in order for items contained therein to be picked in to customer containers DT. This results in a significant number of robotic load handler 30 movements on the tracks above the storage and retrieval system 400. This in turn can lead to congestion and output ports 33 which can lead to synchronisation issues within the system as a whole. This can be a particular problem in robotic picking systems used to store and pick a large number of fast moving consumer items such as may be required in an online grocery fulfilment system. However, this particular problem need not be limited to such a use case.

As shown in FIG. 3a, the object storage handling and retrieval system of the first embodiment of the present invention further comprises a transfer system, the transfer system comprising a transfer station 49 on which items 28 frequently required to be picked in to delivery containers DT may be deposited. The transfer station 49 may comprise some form of table structure or receiving surface on to which items 28 may be transferred from successive storage containers 10 output via an additional output chute 37 from the storage and retrieval system 400. The transfer station 45 is located beneath the storage and retrieval system 400, an output port 33 of the storage and retrieval system 400 being located such that robotic load handling devices 30 operative on the storage and retrieval system 400 may lower a required storage container 10 down to a holding position adjacent the transfer station 49 from where the items 28 contained therein maybe picked, either robotically or manually, on to the transfer station 49.

Whilst the transfer station 49 of the first embodiment of the invention is described above as a table-type structure or surface, it will be appreciated that the transfer station 49 may comprise a shelved-structure such as a VLM as fully described in patent publication number GB 2,524,383B1 (Ocado Innovation Limited).

As shown in FIGS. 3a and 3b, positioned between the transfer station 49 and the pick stations 35 is a track 51 on which a series of Autonomous Guided Vehicles (AGVs) 53 run. The track 51 links the transfer station 49 to an AGV position 55 located at the or each pick station 35 and within reach of the operative at the or each pick station 35. The AGVs 53 comprise a vehicle having an item carrying portion disposed thereon. The AGVs 53 can move under the control of the storage and retrieval system control utility between the transfer station 49 and the or each pick station 35. As shown in FIGS. 3a and 3b, a plurality of AGVs 53 may be in use at any one time.

In use, as shown with reference to the schematic block diagram of the system shown in FIG. 3c, a storage bin 10 is output from the storage and retrieval system 400 via the output port 33 and the output chute 37. The storage bin 10 comprises items 28 required to fulfil customer orders in the planned order horizon. The items 28 are transferred by suitable picking means, robotic 57 or manual, on to the transfer station 49. It will be appreciated that a number of items 28 are picked from the storage bin 10 on to the transfer station, the items 28 remaining on the transfer station 49 until required at the or each pick station 35 at which an order is to be picked requiring at least one of said transferred items 28.

When the storage bin 10 is empty or when a predetermined number of items 28 have been picked, the storage bin 10 is returned to the storage system 400 via the chute 37. It will be appreciated that the storage bin 10 may be collected by a load handling device 30 operative on the storage and retrieval system 400. However, it is possible that the storage bin 10 is returned to the storage system 400 via any other suitable means (not shown).

Moreover, if the storage bin 10 contains no further items 28 to be stored the empty storage bin 10 may be returned to a storage bin filling station (not shown) in order to be replenished with items 28.

Items 28 now located on the transfer station 49 may be robotically or manually removed from the transfer station 49 and placed on AGVs 53. The AGVs comprising the picked items 28 are moved on the track 51 under the control of a suitably programmed utility to the AGV position 55 located at the or each pick station 35 requiring such an item 35.

As can be seen in FIG. 3c, items required in delivery containers DT may be moved from the storage and retrieval system 400 to pick stations via a number of means. Firstly, a storage bin comprising the item 28 may be moved to the storage bin side 41 of the pick station 35 via the load handling device 30 and the input chute 41' of the storage bin side 41 of the pick station. Alternatively, as described above, the storage bin 10 comprising the required items 28 may be output from the storage and retrieval system 400 via the chute 37 to a point adjacent the transfer station 49 at which point the items 28 are transferred to the transfer station 49 an on to individual AGVs. Individual items 28 are then transferred via the track 51 on AGVs 53 to the pick stations AGV location 55 from where the item can be picked by the operative in to a delivery container DT in the delivery container side 41 of the pick station 35.

It will further be appreciated that each pick station 35 may further comprise a temporary holding facility 47 in which the operative places individual items 28 delivered to the pick station via any of the above described means required at a point in the item planning horizon but not required for a given delivery container DT located at that instant in time at the pick station 35.

Once a delivery container DT comprises all the items required for the given customer order or part thereof, the delivery container DT is returned to the storage and retrieval system 400 for onward dispatch to the customer at the required time. It will be appreciated that the delivery container DT may be returned to a storage position within the storage and retrieval system 400 or may be transported directly to a dispatch area. In either event, the delivery container may be transported by a load handling device operative on the storage and retrieval system 400.

As described above and with reference to FIG. 3c a pick station may be supplied with individual items for customer orders via storage bins 10 routed to the storage side of the pick station 35, or via AGVs 53 or via a combination of both of these routing methods with additional storage space being provided at the pick station in temporary holding location 49.

Different possible routes of items 28 and storage bins 10 and delivery containers DT are represented by different forms of arrows in FIG. 3c.

It will be appreciated that not all pick stations 35 in a given facility need have all of the options described above. For example, it may be possible for only half of the pick stations in any given facility to have AGV locations 55 and therefore some pick stations 35 may only be supplied via load handling devices 30 suppling storage bins 10 to the storage bin side 41 of the pick station 35. Furthermore, not all pick stations 35 may be provided with temporary holding locations 47. However, it will also be appreciated that every pick station 35 in a given facility may be provided with all of the options described above and represented schematically in FIGS. 3a, 3b and 3c.

FIGS. 4a, 4b and 4c show a facility in which the pick stations 35 associated with a given storage and retrieval system 400 comprise all of the supply mechanisms described above. As can be seen in FIG. 4b, a plurality of transfer stations 49 are provided, linked by a common track 51, the track 51 linking all the pick stations 35 in the facility.

In this way, items 28 required at pick stations 35 may be brought to any one of the transfer stations 49 as described above and picked robotically or manually on to AGVs 53 for onward transmission to the AGV location 55 of any pick station 35. IT will be appreciated that in the case of robotically picking the items, each transfer station may be provided with a robotic picking device capable of picking a particular type of item 28. For example one transfer station 49 may be provided with a robotic picking arm capable of picking heavy items, one transfer station 49 may be provided with a robotic picking arm capable of picking bottles and a further transfer station 49 may be provided with a robotic picking arm capable of picking boxes. However, it will be appreciated that each robotic picking arm may be provided with means for picking any item of any weight, size or configuration.

Additionally, it will be appreciated that the AGVs 53 may comprise any suitable form of AGV capable of carrying any of the items 28 required at the pick stations 35. Each AGV may be provided with means for carrying one or more items as required at any given pick station 35.

In this way, it will be appreciated that items 28 delivered to the transfer system from the storage and retrieval system 400 may be conveyed to the pick stations 35 independently of the normal operation of the pick station 35, thereby providing an additional supply of items 28 to the pick station without requiring multiple additional load handling device 30 movements in the storage and retrieval system 400.

FIGS. 5a and 5b show a further form of the invention in which the AGV 53 and track 51 combination is replaced by a series of conveyors 58 carrying trays 59. The transfer stations 49 of the previous embodiments of the invention remain and the manner in which items are moved from storage bins 10 in the storage and retrieval system 400 on to the transfer stations 49 is as previously described. However, once on the transfer station 49, the individual items 28 are transferred in to trays 59 located on the conveyors 58. The trays 59 are moved on the conveyors 58 to tray locations 55 located at the pick stations 35.

The conveyor 58 may comprise any suitable form of conveyance means and may include but not be limited to, driven roller conveyor, high speed driven conveyor means or proprietary conveyor means such as ACOPOStrak™ conveyor or any other suitable for of conveyance means capable of carrying items 28 on trays 59 from transfer stations 49 to pick stations 35.

It will be appreciated that any given facility may comprise a combination of all of the systems described above. Furthermore, the facility may be adapted to be entirely automated using only robotic picking devices for transferring items from storage bins 10 to transfer stations 49 to secondary conveyance means such as a tray 59, conveyor 58 combination or on and off AGVs 53 to delivery containers DT or for transferring items directly from storage bins 10 to delivery containers DT at pick stations 35 whether using temporary storage locations 47 or not.

Moreover, it will be appreciated that the use of secondary transfer means to move items from the storage and retrieval system 400 to the pick station 35 for picking in to delivery containers DT reduces the number of load handling device movements on the storage and retrieval system as a single storage bin 10 may be retrieved by a single load handling device 30 yet that storage bin may have all of the items 28 contained therein removed and accessible to every pick station 35 in the facility for a single load handling device movement.

It will be appreciated that the conveyance means of the invention may comprise other forms or conveyance devices such as for example but not limited to drones, hovercraft and other manual conveyance methods, for example coolies or other manual conveying means. Furthermore, the AGVs or other forms of conveyance means may be of different types depending on the types of products to be conveyed.

In this way, the multiple methods of transferring items 28 in to delivery containers DT enable items 28 spread across a given facility pareto to be supplied to pick stations 35 efficiently and in a timely manner, the method selected of transfer for any given item being managed according to the frequency and number of items 28 required for given orders at given pick stations 35.

Whilst the above embodiments are described with reference to a single-spaced grid-based storage and retrieval system, it will be appreciated that the invention may be used in association with any other form of grid-based storage system storage and retrieval system such as Autostore™ in which the load handling devices occupy multiple grid spaces on the storage and retrieval system or a Knapp™ OSR shuttle and racking based system or any other form of storage and retrieval system having an output port from which items 28 may be output.

Furthermore, whilst the embodiments of the invention have been described with reference to items 28 to be picked for orders comprising multiple items, for example in an online grocery order fulfilment environment, it will be appreciated that the invention may be used in other forms of online retail and supply, such as general merchandise fulfilment. Moreover, the invention may be applied to storage and retrieval systems used in other fulfilment and sortation environments such as parcel sortation and delivery and other logistics fulfilment scenarios such as spare part supplies in a fabrication or assembly situation—the term fulfilment to be interpreted broadly to include the fulfilment of any item requirement.

The invention claimed is:

1. A fulfilment system, comprising:
   a storage and retrieval system including a grid-based storage system having at least one load handling device operative on a series of tracks located on top of a framework of uprights, the storage and retrieval system including containers arranged in stacks within the framework, accessible from above by the at least one load handling device,
   a pick station configured such that an operative is able to pick an item from a storage container and transfer the picked item to a delivery container, the pick station having a storage item side and a picked item side, the storage item side including a storage container input and a storage container output, the storage container input and output respectively having an output and input chute or a single chute of the storage and retrieval system for a storage container to be lowered or lifted by a lifting mechanism of the at least one load handling device, the storage item side and the picked item side are arranged to meet such that, in normal operation, an item in a storage container may be moved by an operative located at the pick station into a delivery container; and
   a transfer system positioned between the storage and retrieval system and the pick station for conveying items to the pick station independently of the normal operation of the pick station, the transfer system having a transfer station and conveyance means linking the transfer station to the storage item side of the pick station such that a portion of items to be picked in to delivery containers DT at the pick station is supplied to the pick station by the conveyance means, the conveyance means including a plurality of item transport devices operable on a track, and the track being configured and adapted to link the pick station with the transfer station.

2. A fulfilment system according to claim 1, in which the item transport devices comprise:
   autonomous guided vehicles.

3. A fulfilment system according to claim 1, in which the conveyance means comprise:
   a plurality of item transport containers carried on a conveyor, the conveyor being configured and adapted to link the pick station with the transfer station.

4. A fulfilment system according to claim 1, in which the transfer system comprises:
   robotic picking means configured and adapted to pick items from a storage container output from the storage and retrieval system on to the transfer station.

5. A fulfilment system according to claim 4, in which the robotic picking means is configured and adapted to pick items from the transfer station on to the conveyance means.

6. A fulfilment system according to claim 1, in which the pick station comprises:
   a temporary holding location for temporary storage of items delivered to the pick station.

7. A fulfilment system according to claim 1, in which the containers include storage bins and delivery containers DT nested in storage bins, the storage bins being configured to be stored in stacks within the framework of uprights, the load handling devices being configured and adapted to retrieve containers DT from above, the or each load handling device having a cross-sectional area greater than that of a container only to the extent that the load handling device may operate on tracks above the stacks and retrieve predetermined containers.

8. A fulfilment system according to claim 7, in which the load handling device is configured to occupy a single space of the grid of tracks disposed above the stacks.

9. A fulfilment system according to claim 1, in which the storage and retrieval system comprises:
   a shuttle and racking system.

10. A method of handling items in a fulfilment system having a storage and retrieval system including a grid-based storage system having at least one load handling device operative on a series of tracks located on top of a framework of uprights, the storage and retrieval system including containers arranged in stacks within the framework, accessible from above by the at least one load handling device, a transfer system positioned between the storage and retrieval system and the pick station for conveying items to the pick station independently of the normal operation of the pick station, the transfer system having a transfer station and conveyance means linking the transfer station to the storage item side of the pick station such that a portion of items to be picked in to delivery containers DT at the pick station is supplied to the pick station by the conveyance means, the conveyance means including a plurality of item transport devices operable on a track, and a pick station configured such that an operative is able to pick an item from a storage container and transfer the picked item to a delivery container, the track being configured and adapted to link the pick station with the transfer station, the pick station having a storage item side and a picked item side, the storage item side including a storage container input and a storage container output, the storage container input and output respectively having an output and input chute or a single chute of the storage and retrieval system for a storage container to be lowered or lifted by a lifting mechanism of the at least one load handling device, and the storage item side and the picked item side are arranged to meet such that, in normal operation, an item in a storage container may be moved by an operative located at the pick station into a delivery container, the method comprising:
   retrieving a container having items from the storage and retrieval system;
   transferring items from the retrieved container to a transfer station 4 in the transfer system;
   transferring at least one item from the transfer station to conveyance means;
   conveying the at least one transferred item or items to the pick station; and
   picking the at least one item from the conveyance means at the pick station.

11. A method according to claim 10, comprising:
   picking the item from the conveyance means at the pick station to a temporary storage location located at the pick station.

12. A method according to claim 10, comprising:
   picking an item into a delivery container DT for onward transmission to a dispatch portion of the fulfilment system.

13. A method according to claim 10, in which the picking and/or transferring comprises:
   robotically picking or transferring the item.

14. A method according to claim 10, in which the retrieving comprises:
   delivering a container to the transfer system from the storage and retrieval system using a load handling device operative on the storage and retrieval system.

15. A method according to claim 10, in which the conveying comprises:
   conveying the or each item via autonomous guided vehicles.

16. A method according to claim 10, in which the conveying comprises:
   conveying the or each item via a conveyor.

* * * * *